Sept. 26, 1944.  H. G. ROBINSON  2,358,880
ABRASIVE CUTOFF MACHINE
Filed March 17, 1941  3 Sheets-Sheet 1
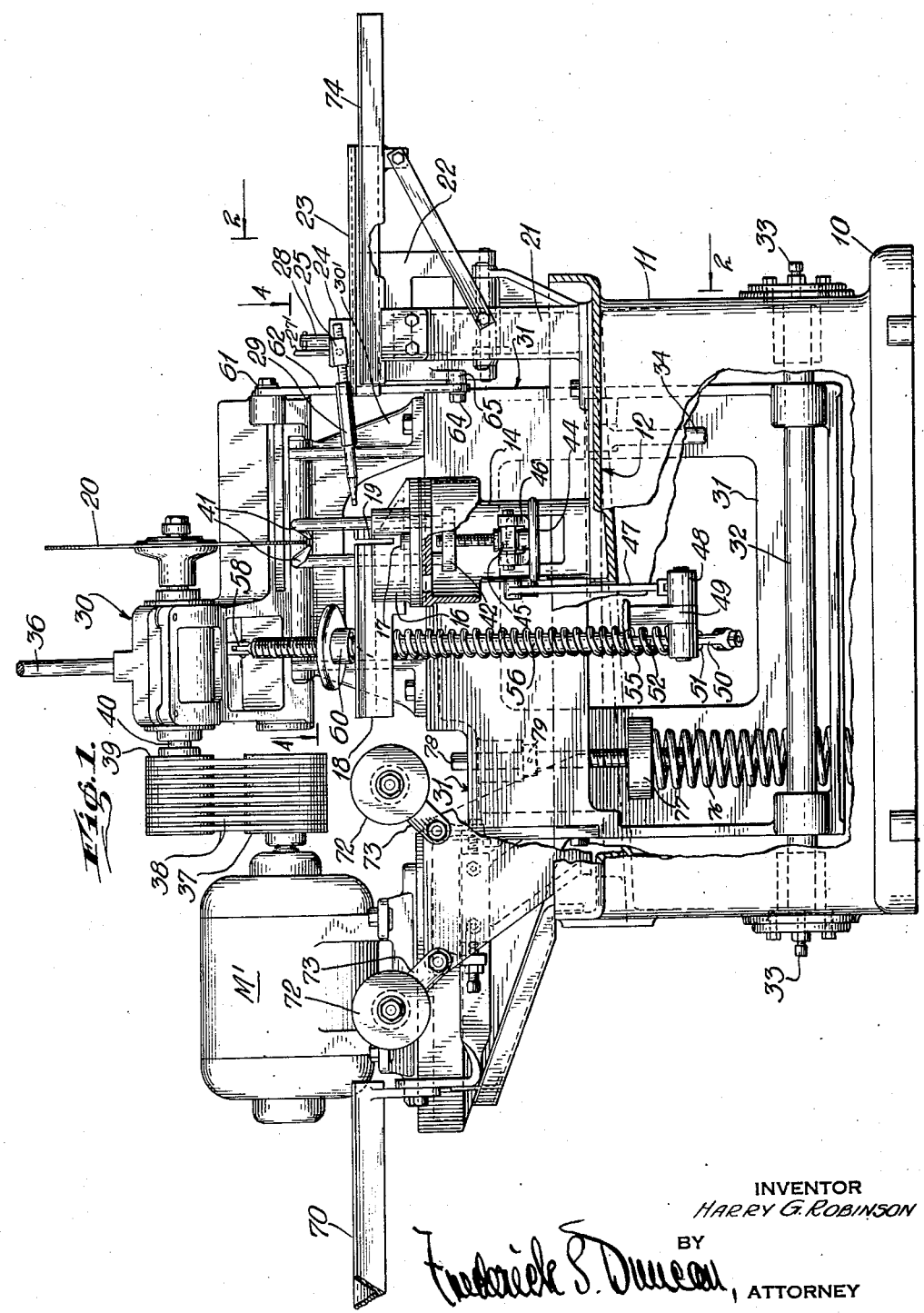
INVENTOR
HARRY G. ROBINSON
BY
Frederick S. Duncan, ATTORNEY

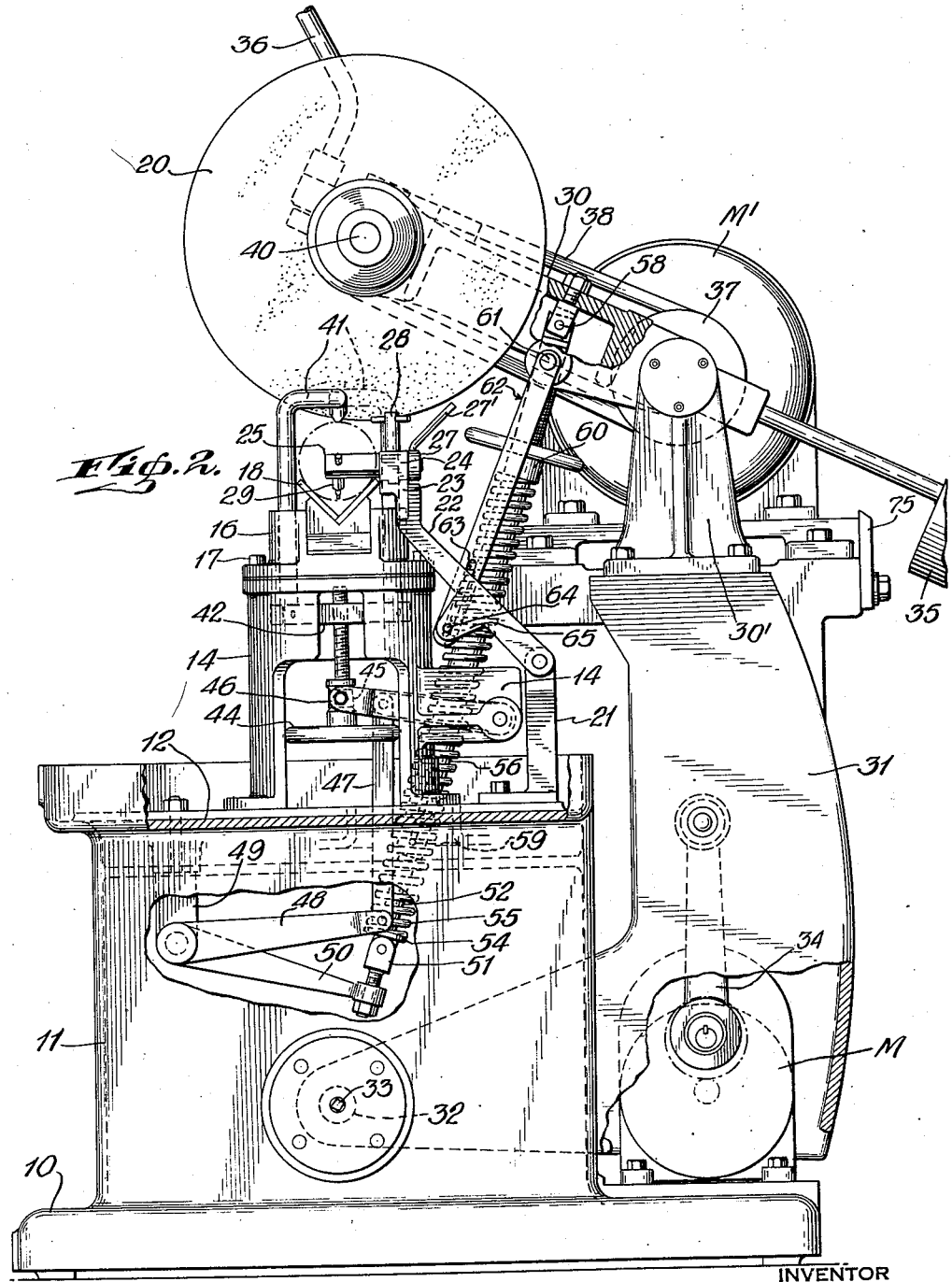

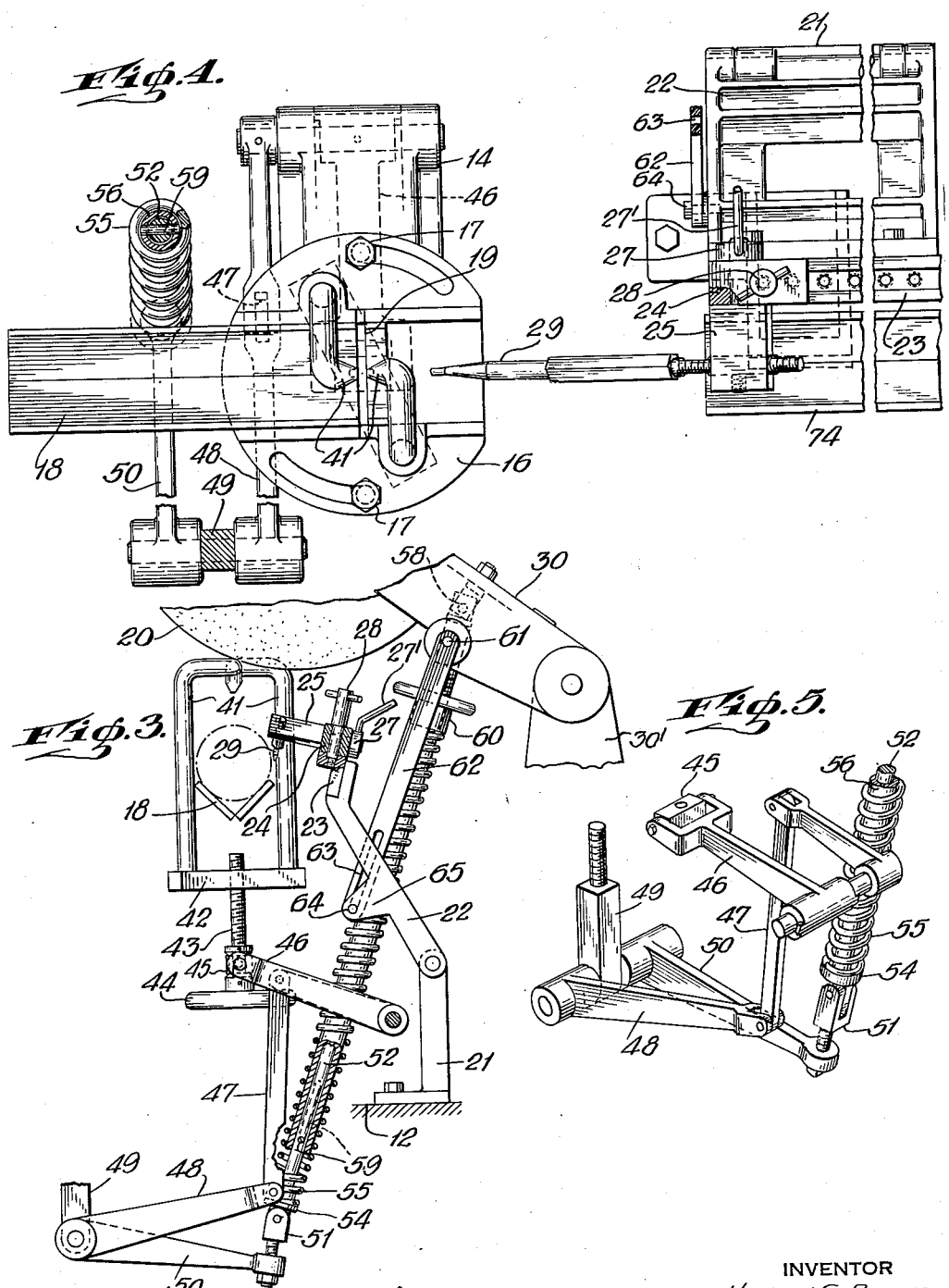

Patented Sept. 26, 1944

2,358,880

UNITED STATES PATENT OFFICE 2,358,880

ABRASIVE CUTOFF MACHINE

Harry G. Robinson, Stratford, Conn., assignor to American Chain & Cable Company, Inc., New York, N. Y., a corporation of New York Application March 17, 1941, Serial No. 383,733

6 Claims. (Cl. 51—98)

This invention relates to cutoff machines more particularly of the type employing abrasive cutoff discs.

One of the objects of this invention is to provide improved means whereby it will be more feasible to feed the abrasive cutoff disc by hand.

Another object of this invention is to provide means for automatically clamping and releasing the work as an incident to moving the abrasive cutoff disc toward and away from the work.

Another object of this invention is the provision of means for automatically moving the work gauge into and out of operative position as the abrasive cutoff disc is moved toward and away from the work.

Other objects of the invention will appear from the following description taken in connection with the drawings in which—

Fig. 1 is a front elevational view, partly broken away, of a cutting machine embodying my improvements, with the clamps and the gauge in operated positions and the cutoff disc about to start cutting;

Fig. 2 is a right hand end elevational view, partly broken away, of said machine with the parts in the same positions as in Fig. 1;

Fig. 3 is a view showing connections between the cutoff disc supporting arm and the work holding clamps and the work gauge in the full "up" position of the cutoff disc;

Fig. 4 is a view taken on the line 4—4 of Fig. 1 of the work holding clamps and the work gauge; and Fig. 5 is a detail perspective view of a part of the operating linkage and leverage connections between the cutoff disc supporting arm and the work holding clamps.

The frame of the machine comprises a base 10 and a rectangular standard 11 on which the various elements of the machine are supported. The standard is provided with a horizontal table or platform 12 upon which is mounted a hollow cylindrical member 14 supporting a clamp guide and work support 16 secured thereto for rotational adjustment by means of clamping screw bolts 17 which pass through arcuate slots in the flanges of the base of the support 16 into the member 14. The member 14 is equipped with a V-shaped work supporting trough 18, the side walls of which are slotted as indicated at 19, Fig. 4, in the plane of the cutoff disc 20. The member 14 and trough 18 can be rotated so as to present the trough and axis of the work at any angle between 90° and 45° with respect to the cutoff disc and the walls of the trough may be slotted angularly by a cutting operation.

Supported also on the horizontal table or platform 12 is a bracket 21 on which is pivotally mounted an arm 22 supporting a track 23 for a slidable carriage 24 in which is rotatably and adjustably supported a work gauge support 25 locked in adjusted position by means of a nut 27 provided with a handle 27' as indicated. The carriage 24 may be held in adjusted position by a pin 28 threadedly engageable in any one of a series of holes in the track so positioned and spaced as to provide for approximate or rough adjustment of the work gauge 29. The work gauge is adjustably supported in the support 25 by a fine thread for minute adjustments to accurately determine and control the length of the material or section cut off from a bar of stock or the like. As indicated in Fig. 1, the side of the threaded end of the gauge may be provided with a scale.

The cutoff disc 20 is supported on an arm 30 which is pivotally supported as by a bracket 30' mounted on an L-shaped rocking frame 31 which in turn is secured at the end of its horizontal portion on a shaft 32 journaled in the end walls of the standard 11. As shown in Fig. 1 means such as adjusting screwthreaded elements 33 may be provided for centering the rocking frame 31 in order to align the cutoff disc 20 with the slot 19 in the work supporting trough 18.

As indicated diagrammatically in Fig. 2 provision is made for rocking the frame 31 about its pivot to reciprocate the cutoff disc across the work which consists of a motor M mounted on the base 10 of the frame of the machine operating through a train of gear connections as indicated by broken lines, an eccentric journaled in an arm 34 pivoted to the rocking frame 31.

The arm 30 is provided with a counterbalancing weight 35 and a handle 36 is provided for rocking the arm up and down to move the disc toward and through the work and out of and away from the work.

Also supported on the rocking frame 31 is a motor M', the shaft of which is equipped with a pulley 37 connected by belts 38 with a pulley 39 on a shaft 40 journaled in the forward end of the arm 30 and upon which the cutoff disc 20 is mounted. The shaft of the motor is alined with the pivotal connection between the arm 30 and the rocking frame 31.

For the purpose of holding the work in position in the work supporting trough 18 a pair of clamps 41 is provided which are preferably shaped as shown and are slidably mounted in the support 16 so as to be capable of movement against the work and away from the work. The clamps are located on opposite sides of the slot 19 and on opposite sides of the trough, and their free ends extend toward each other to engage the work close to the cutting region, to permit angular adjustment of the clamps relative to the cutoff disc for supporting work to be cut on an angle. The lower ends of the clamps are mounted on a spanner 42 in which is adjustably mounted an operating member 43 provided with a hand wheel 44 for adjusting the same. Pivotally connected to a block 45 mounted for rotation on the member 43 between the hub of the hand wheel and a collar pinned on the member 43 is an operating lever 46 suitably supported on a pivot on the member 14 and connected by a link 47 with an arm 48 on a shaft journaled in bracket 49 depending from the table 12 and to which is connected an arm 50. Mounted adjustably on the arm 50 is a yoke like member 51 in which is pivotally supported the lower end of a rod 52 and which is provided with a disc like seat 54 upon which is seated a clamp operating spring 55. The rod 52 telescopes and slides within a hollow rod 56 which is pivotally connected at its upper end as indicated at 58 to the arm 38. A pin and slot connection 59 between the rods provides a lost motion connection to allow the cutoff disc to continue downwardly after the clamps have come down on the work and to raise the clamps and release the work as the cutoff disc is moved away from the work. The upper end of the tubular rod is threaded to adjustably support an upper seat 60 for the spring 55 and the seat is provided with a hand wheel by means of which it may be adjusted to control the normal and initial tension of the spring.

As the cutoff disc 20 and the clamps 40 are moved toward the work by means of the handle 36 the spring 55 is further compressed before the cutoff disc engages the work to clamp the work securely and as the cutoff disc is fed through the work the pressure on the work by the clamps is still further increased and then after the cutting operation is completed and as the cutoff disc is moved out of the slot and away from the work the clamps are released.

For the purpose of moving the work gauge out of its operative position after a cutting operation has been completed and for moving it into operative position before the next cutting operation is started, mechanism is provided for effecting such movements of the work gauge by the movement of the cutoff disc supporting arm. For this purpose one side of the arm is provided with a stud 61 to which is connected one end of a link 62 provided at its other end with an elongated slot 63 into which extends a pin 64 secured in a projection 65 on the work gauge supporting arm 22.

If desired the machine may also be provided with a trough 70 for supporting long pieces of work to be cut and with rollers 72 which are mounted on arms 73 which are adjustable so that the vertical position of the roller 72 may be adjusted to support the work just clear of the troughs 70 and 18. The right hand end of the machine may be provided with a trough 74 suitably supported on the frame of the machine for supporting long pieces of work to be cut or notched and from which long sections are to be cut off.

The upward movement of the disc 20 may be limited and controlled by an adjustable stop plate 75 Fig. 2 located for engagement by the arm supporting the weight 35. The movement of the rocking frame 31 toward the right Fig. 2 may be cushioned by a spring 76 Fig. 1 seated on the base of the frame of the machine and bearing against a seat disc 77 into which is threaded an adjusting bolt 78 passing through the rocking frame 31 and provided with a collar 79 abutting said frame. The downward movement of the gauge may be limited by the engagement of its support 24 with the trough 74.

The cutoff disc is shown in its uppermost position in Fig. 3 with the clamps in full release position and the work gauge moved out of the path of the work into which position it was moved during the previous operation to release the section cut off and permit it to fall from the trough 18. In carrying out the cutting operation, the work is placed on the trough 18 and moved to approximate position for the cutting operation. The cutoff disc is then lowered by means of the handle 36. At the beginning of this operation and before the clamps are moved into engagement with the work, the work gauge drops into position and then the end of the work is moved against the gauge. As the movement of the cutoff disc is continued or resumed, the clamps are moved into engagement with the work and before the cutoff disc engages the work, so that the work is securely held as the cutoff disc engages the work. The motor M' is preferably set in operation before the cutoff disc is lowered and if it is desired to use the back and forth oscillating feature of the invention the motor M is also preferably set in operation at the same time. Further movement of the handle 36 will bring the cutoff disc into contact with the work. As a further downward movement of the cutoff disc is continued to feed the cutoff disc through the work, the spring 55 is further compressed which increases the pressure of the clamps on the work as the cutting operation proceeds, the greatest amount of pressure being exerted at the time the cutoff operation is being completed. The cutoff disc is then moved out of the cut, the spring 55 functioning to hold the work and the section cut off securely clamped until the cutoff disc has been raised free of the work after which the clamps are released and the work gauge is moved into the position shown in Fig. 3 releasing the section cut off and permitting the same to drop off from the trough 18 if its length is such that the center of gravity is located beyond the end of the trough or to permit the same to be removed manually, if it is relatively thin or short. The initial amount of compression of the spring 55 may be controlled by the hand wheel 60 and the initial position of the clamps may be controlled by the hand wheel 44, depending upon the character and thickness of the work to be cut. The work engaging ends of the clamps are pointed as shown to permit of close spacing when work is cut at acute angles.

While I have described with particularity a preferred embodiment of my invention, it is to be understood, since various modifications may suggest themselves to one familiar with this art after understanding my invention, that I reserve the right to all such changes as fall within the principles of this invention and the scope of the appended claims.

I claim:

1. In a cutoff machine comprising a frame, a carrier for supporting a cutoff disc mounted for movement on the frame to move said cutoff disc toward and through the work and out of and away from the work, a cutoff disc carried by said carrier, a work gauge, and an operative connection between said carrier and said work gauge for moving said work gauge out of operating position as said carrier moves said cutoff disc into its home position and constructed to cause said work gauge to be moved into operating position upon movement of said carrier to move said cutoff disc toward the work and before said disc engages the work.

2. In a cutoff machine comprising a frame, a carrier for supporting a cutoff disc mounted for movement on the frame to move said cutoff disc toward and through the work and out of and away from the work, a cutoff disc carried by said carrier, a work gauge, an operative connection between said carrier and said work gauge for moving said work gauge out of operating position as said carrier moves said cutoff disc into its home position and constructed to cause said work gauge to be moved into operating position upon movement of said carrier to move said cutoff disc toward the work and before said disc engages the work, and clamping means for clamping the work operated by said carrier to clamp the work after said work gauge has been moved into operating position.

3. In a cutoff machine comprising a frame, a cutoff disc, a carrier therefor mounted on said frame for moving said disc toward and through the work and out of and away from the work, manipulative means for so moving said carrier by the hand of the operator, and means for opposing the movement of said carrier as it is moved to carry the disc into engagement with the work constructed to come into operation after an initial free movement of said carrier and just prior to engagement of the cutoff disc with the work.

4. In a cutoff machine comprising a frame, a cutoff disc, a carrier for the cutoff disc mounted on said frame for moving said cutoff disc toward and through the work and out of and away from the work, manipulative means for so moving said carrier by the hand of the operator, clamping means for clamping the work to be cut and an operative connection between said carrier and clamping means for moving said clamping means against and away from the work and against the work prior to engagement of said cutoff disc with the work, said connection including means operable to initially cushion the movement of said carrier and disc upon engagement of said clamping means with the work.

5. In a cutoff machine comprising a frame, a cutoff disc, a carrier for the cutoff disc mounted on said frame for moving said disc toward and through the work and out of and away from the work, manipulative means for so moving said carrier by the hand of the operator, clamping means for clamping the work to be cut, an operative connection between said carrier and clamping means for moving said clamping means against the work and a cushioning means for cushioning the movement of said carrier operable initially after initial movement of said carrier and after the clamping means has engaged the work and before the disc engages the work.

6. In a cutoff machine comprising a frame, a cutoff disc, a carrier for the cutoff disc mounted on said frame for moving said disc toward and through the work and out of and away from the work, manipulative means for moving said carrier by the hand of the operator, clamping means normally spaced from the work for movement against the work to clamp the work in position and an operating connection between said carrier and said clamping means for moving the clamping means directly by and proportionately to the movement of said carrier to bring the clamping means into engagement with the work, said operating connection involving a yielding compressible, non-extensible element yielding upon engagement of the clamping means with the work for permitting movement of the carrier to engage the disc with the work and to move the disc through the work and inextensible to cause the clamping means to be moved positively away from the work by movement of the carrier into its home position.

HARRY G. ROBINSON.